(12) United States Patent
Lin et al.

(10) Patent No.: US 9,796,011 B2
(45) Date of Patent: Oct. 24, 2017

(54) FORMING DIE WITH FLEXIBLE BLANK HOLDER

(71) Applicant: National Kaohsiung First University of Science and Technology, Kaohsiung (TW)

(72) Inventors: Bor-Tsuen Lin, Kaohsiung (TW); Kuan-Yu Su, Kaohsiung (TW); Huai-Xiang Liu, Kaohsiung (TW); Cheng-Yu Yang, Kaohsiung (TW)

(73) Assignee: National Kaohsiung First University of Science and Technology, Kaohsiung (TW)

( * ) Notice: Subject to any disclaimer, the term of this patent is extended or adjusted under 35 U.S.C. 154(b) by 243 days.

(21) Appl. No.: 14/856,907

(22) Filed: Sep. 17, 2015

(65) Prior Publication Data

US 2016/0368036 A1 Dec. 22, 2016

(30) Foreign Application Priority Data

Jun. 16, 2015 (TW) .............................. 104119374 A

(51) Int. Cl.
| | | |
|---|---|---|
| *B21D 22/10* | (2006.01) | |
| *B21D 26/031* | (2011.01) | |
| *B30B 5/02* | (2006.01) | |
| *B21D 22/02* | (2006.01) | |
| *B21D 22/12* | (2006.01) | |
| *B29C 43/10* | (2006.01) | |

(52) U.S. Cl.
CPC ........... *B21D 26/031* (2013.01); *B21D 22/02* (2013.01); *B21D 22/12* (2013.01); *B29C 43/10* (2013.01); *B30B 5/02* (2013.01)

(58) Field of Classification Search
CPC ........ B21D 22/12; B21D 26/02; B21D 26/31; B30B 5/02; B29C 43/10
USPC .......................................................... 72/456
See application file for complete search history.

(56) References Cited

U.S. PATENT DOCUMENTS

| | | | | |
|---|---|---|---|---|
| 3,172,928 | A * | 3/1965 | Johnson | ................... B29C 43/10 |
| | | | | 264/294 |
| 4,748,837 | A * | 6/1988 | Kurosawa | .............. B21D 22/12 |
| | | | | 29/421.1 |
| 4,765,166 | A * | 8/1988 | Bergman | ............... B21D 22/12 |
| | | | | 29/421.1 |
| 4,833,903 | A * | 5/1989 | de Smet | .................... B30B 5/02 |
| | | | | 72/350 |
| 5,505,071 | A * | 4/1996 | Hall, Jr. | ................. B21D 22/22 |
| | | | | 72/350 |

(Continued)

*Primary Examiner* — David B Jones
(74) *Attorney, Agent, or Firm* — Muncy, Geissler, Olds & Lowe, P.C.

(57) ABSTRACT

A forming die with a flexible blank holder is provided. The forming die includes an upper die set, a lower die set, and a blank holder with a flexible pad. The upper die set has an upper die base and an upper die insert provided on the upper die base and has a cavity surface. The lower die set has a lower die base, an elastic member on the lower die base, and a lower die punch on the lower die base. Guide posts are provided between the upper die set and the lower die set to define relative positions of the two die sets. Through relative movement of the upper and the lower die sets, a blank placed on the blank holder there between is formed by forming. During the forming, the flexible pad is tightly pressed against the blank under the pressing force of the elastic member.

11 Claims, 6 Drawing Sheets

(56) References Cited

U.S. PATENT DOCUMENTS 5,540,075 A * 7/1996 Hall, Jr. .................. B21D 22/12
  72/60
5,649,438 A * 7/1997 Hall, Jr. .................. B21D 26/02
  72/60
5,749,254 A * 5/1998 Hall, Jr. .................. B21D 22/12
  29/421.1

* cited by examiner

FORMING DIE WITH FLEXIBLE BLANK HOLDER

CROSS-REFERENCE TO RELATED APPLICATION

This application claims the benefit of Taiwan Patent Application No. 104119374, filed on Jun. 16, 2015, which is hereby incorporated by reference for all purposes as if fully set forth herein.

BACKGROUND

Technical Field

The present invention relates to a stamping or hydroforming die, and more particularly to a forming die with a flexible blank holder.

Related Art

To form a product of a complicated shape by cold stamping in the prior art, the clearances between the upper die insert and blank holder needs to be adapted, which generally requires three to ten days and thereby prolongs the process of product development.

In a conventional hydroforming die, an O-ring is used for sealing. However, abrasion and leakage may easily occur due to dramatically small contact area between the O-ring and the blank.

Moreover, as for the stamping or hydroforming dies, a punching forming die 10 in the prior art (shown in FIG. 1) is provided with an upper die set 11 and a lower die set 12 (having a lower die punch 121) which are in relative movement, and a metal blank holder 15 is placed between the upper die set 11 and the lower die set 12. In this way, forming by punching is implemented. However, in the forming process, a blank 14 needs to be tightly retained by the metal blank holder 15 and a metal upper die 13, and therefore, the blank may be easily cracked or scraped by forming, which requires extra time and cost for grinding and polishing the die.

SUMMARY

The present invention is directed to provide a stamping die which has a flexible blank holder instead of a metal blank holder, to increase the fluidity property when a blank is formed.

The present invention is also directed to provide a hydroforming die which has a flexible blank holder instead of a metal blank holder, to increase the fluidity and sealing property when a blank is formed.

To implement the stamping die, the present invention provides a forming die with a flexible blank holder, which is applied to form and process a blank by cold stamping or warm stamping. The structure of the stamping die includes an upper die set, having an upper die base and an upper die insert which is provided on the upper die base and has a cavity surface; a lower die set, having a lower die base, an elastic member provided on the lower die base, and a lower die punch provided on the lower die base; and a flexible blank holder, having a blank holder body and a flexible pad provided on a pressing surface of the blank holder body. The blank holder body is connected to an open end of the elastic member. Guide posts are provided between the upper die set and the lower die set to define relative positions of the two die sets. Through relative movement of the upper die set and the lower die set, a blank placed on the pressing surface of the blank holder between the upper and lower die sets is formed. During the forming process, the flexible pad is tightly pressed against the blank upon the upper die insert under the pressing force of the elastic member.

To implement the hydroforming die, the present invention provides a hydroforming die with a flexible blank holder for forming and processing a blank. The hydroforming die includes an upper die set, having an upper die base and an upper die insert which is provided on the upper die base and has a cavity surface; a lower die set, having a lower die base and a hydraulic divide block provided on the lower die base; and a flexible blank holder, having a blank holder body and a flexible pad provided on a pressing surface of the blank holder body. The blank holder has a through passage, and the passage is assembled with the hydraulic divide block to form a hydraulic chamber. Guide posts are provided between the upper die set and the lower die set to define relative positions of the two die sets, and thereby, the upper die set and the lower die set are closed. A high-pressure liquid is guided into the hydraulic chamber through the hydraulic divide block, to form a blank placed on the pressing surface. During the forming process, the flexible pad is tightly pressed against the blank upon the upper die insert.

The present invention has the following features. 1. The flexible blank holder directly contacts the blank, and scrapes caused by forming may not occur on the surface of the formed blank which is in contact with flexible object, such as rubber or PU. 2. The flexible blank holder is capable of automatically adjusting spacing of the dies. As the thickness of blank may increase in forming, the flexible pad can automatically change the spacing between the upper and lower die sets in accordance with the thickness of the blank, and thus adaptation of the clearance between the upper die and blank holder in the prior art is not needed and the die adaptation time is reduced. 3. The flexible blank holder is leakage proof and can be used for sealing in hydroforming of a blank. As the flexible pad covers the entire blank surface, leakage caused by partial wrinkle of the blank can be prevented. 4. The flexible blank holder does not require die adaptation through bench work, so the labor cost due to performance reconfiguration of the die after mass production is reduced. The performance reconfiguration generally takes three days, while only flexible object needs to be replaced in the flexible blank holder of the present invention. 5. The flexible blank holder can lower the probability that the thickness of the blank is reduced during the forming process, and the difference of overall thickness of the blank is reduced. 6. The hydroforming of a blank avoids leakage caused by wrinkle of the blank, and reduces the reject ratio of the products.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1:
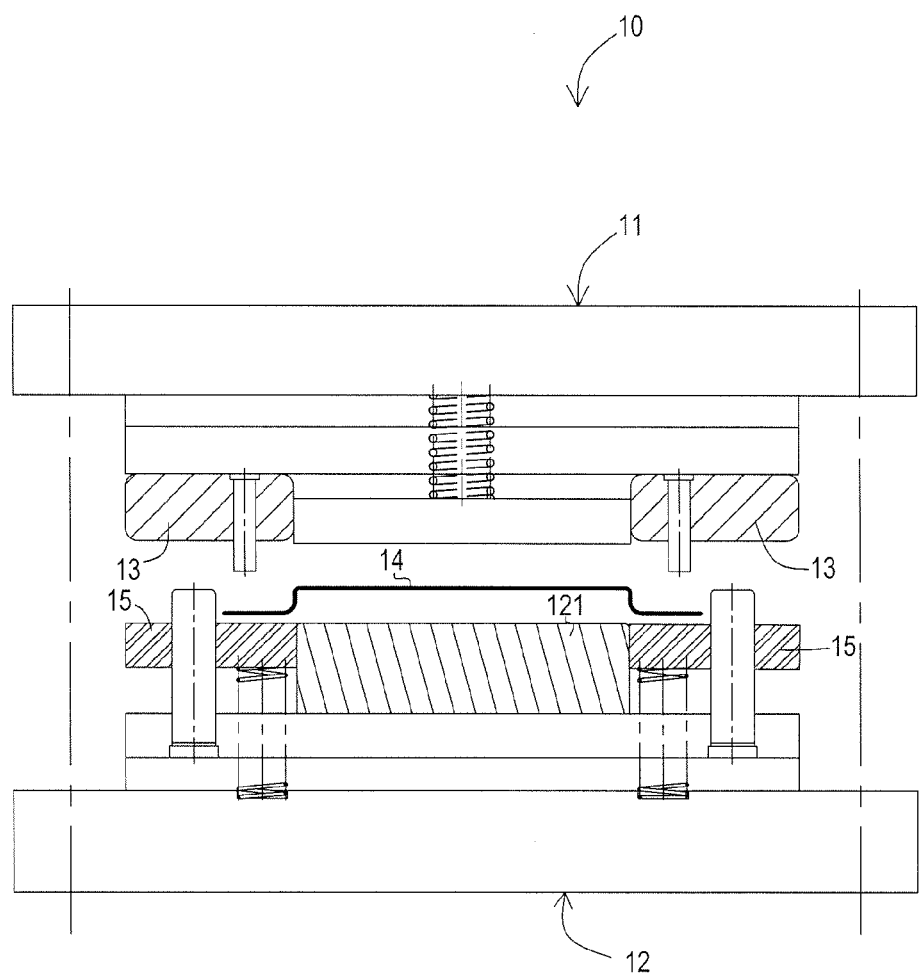
FIG. 1 is a schematic front cross-sectional view of a punching forming die in the prior art.

Embodiments of the present invention are illustrated in detail below with reference to the accompanying drawings. The accompanying drawings are simplified, and merely illustrate the basic structure of the present invention. Therefore, elements related to the present invention are marked in the drawings, and the displayed elements are not depicted by the exact quantity, shape, proportion and the like in the implementation. The specification and proportion of the elements in actual implementation are optional, and the layout of the elements may be more complicated.

Figure 2:
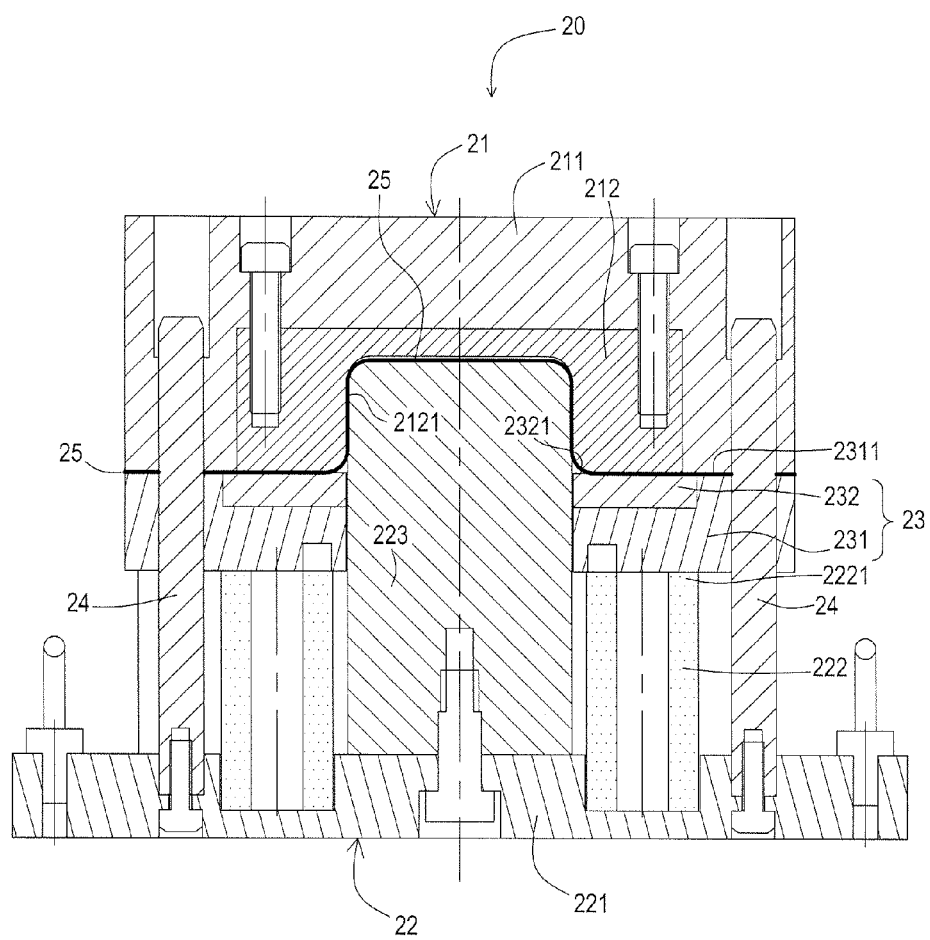
FIG. 2 is a schematic front cross-sectional view of a stamping die according to an embodiment of the present invention.
Figure 3:
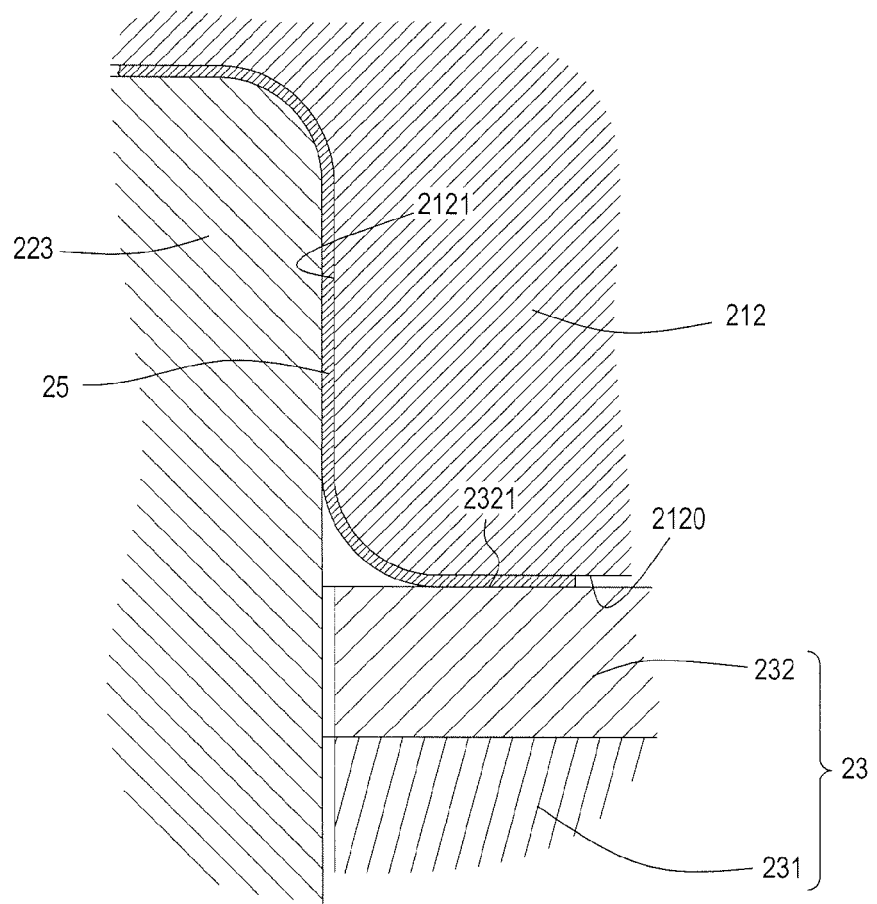
FIG. 3 is a schematic partial enlarged view of a flexible pad tightly pressed against a blank in a stamping process according to the embodiment in FIG. 2.

First referring to FIG. 2 and FIG. 3, a stamping die 20 in this embodiment has a blank holder 23 with a flexible pad 232, and is applied to form and process a blank 25 by cold stamping. The structure of the stamping die 20 includes: an upper die set 21, having an upper die base 211 and an upper die insert 212 which is provided on the upper die base 211 and has a cavity surface 2121; a lower die set 22, having a lower die base 221, an elastic member 222 provided on the lower die base 221, and a lower die punch 223 provided on the lower die base 221; and a blank holder 23, having a blank holder body 231 and a flexible pad 232 provided on a pressing surface 2311 of the blank holder body 231 (the flexible pad 232 is made of rubber, PU, or other soft materials of similar properties). The blank holder body 231 is connected to an open end 2221 of the elastic member 222 (the elastic member 222 is preferably a compression spring, but the present invention is not limited thereto, and any other element capable of providing a pressing force can be used). Guide posts 24 are provided between the upper die set 21 and the lower die set 22 to define relative positions of the two die sets. Through relative movement of the upper die set 21 and the lower die set 22, the blank 25 placed on the pressing surface 2311 of the blank holder 23 between the upper and lower die sets (21, 22) is formed. During the forming process of the blank 25, the flexible pad 232 is tightly pressed against the blank 25 upon the upper die set 21 under the pressing force (elastic restoring force) of the elastic member 222.

Further referring to the structure of the embodiment shown in FIG. 3, experiments show that, the blank 25 is capable of sliding on an inner surface (that is, the surfaces 2120 and 2121) of the upper die insert 212 and an outer surface 2321 of the flexible pad 232. During the forming process, the elastic member 222 provides a sufficient pressing force, to ensure that the blank holder 23 may not be lifted by wrinkling of the blank 25. The forming process of the blank 25 shows that, the flexible pad 232 can be firmly clamped on the blank 25 to prevent the blank 25 from being wrinkled. The blank 25 contacts the outer surface 2321 of the flexible pad 232, and due to material characteristics of the flexible pad 232, the blank 25 may not be scraped by drawing, so that the thickness of the blank 25 is not easily reduced, which is superior to the prior art where a metal blank holder is used.

In an embodiment, the flexible pad 232 is corresponding to a lower surface 2120 of the upper die insert 212, and the flexible pad 232 covers the region of the cavity surface 2121.

In an embodiment, the upper die insert 212 and the upper die base 211 are integrally made.

Figure 4:
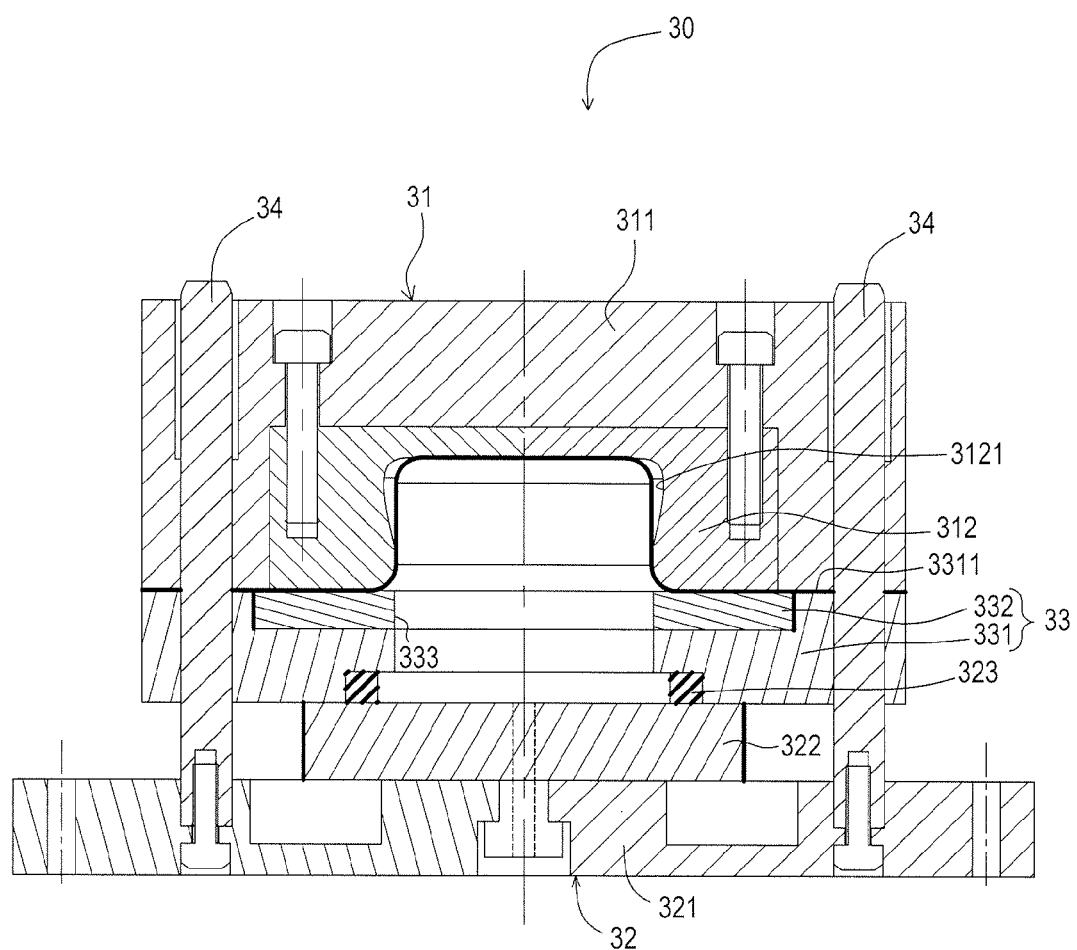
FIG. 4 is a schematic front cross-sectional view of a hydroforming die according to an embodiment of the present invention.
Figure 5:
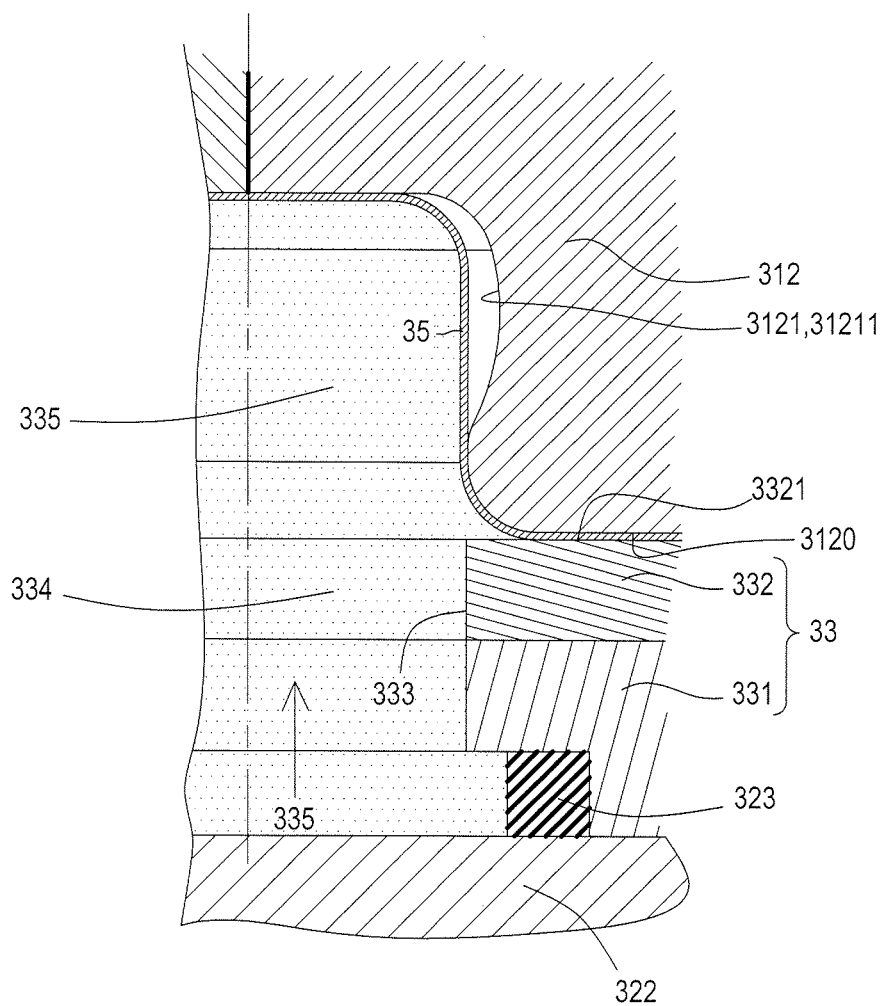
FIG. 5 is a schematic partial enlarged view of a flexible pad tightly pressed against a blank in a hydroforming process according to the embodiment in FIG. 4.
Figure 6:
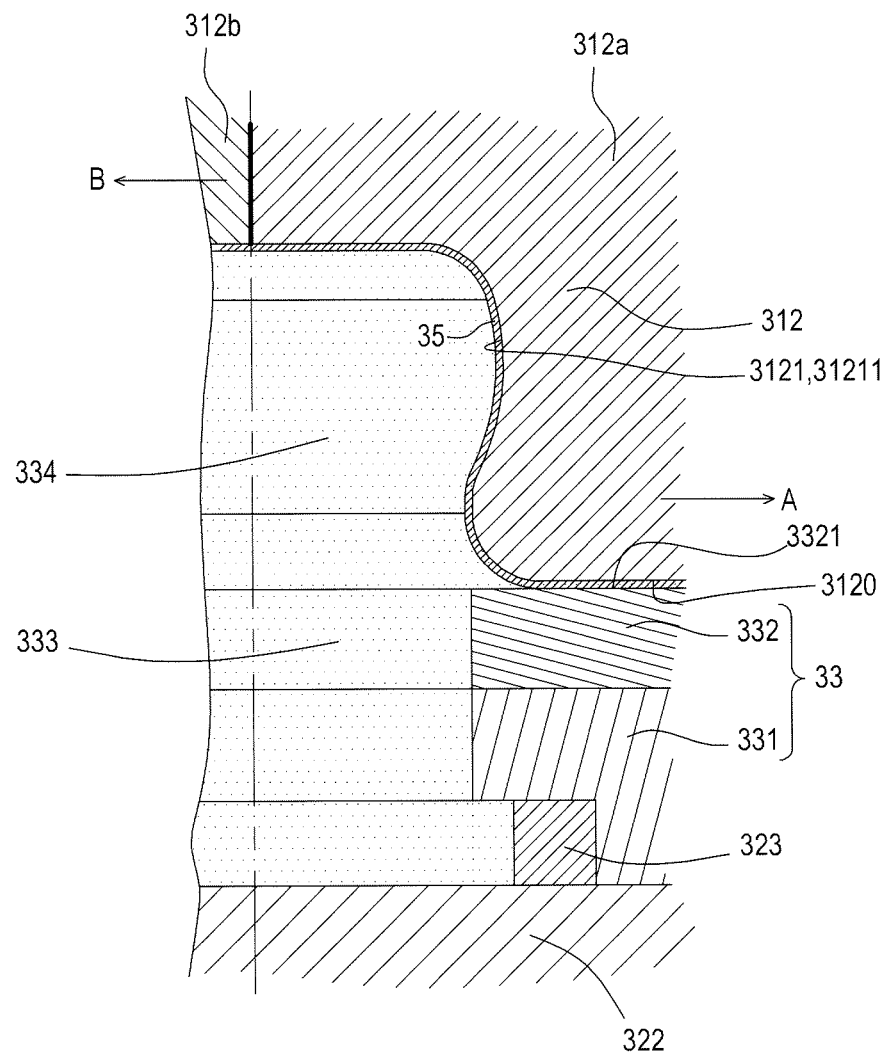
FIG. 6 is a schematic view of hydroforming and die release with a negative draft angle according to the embodiment in FIG. 4.

Further referring to FIG. 4, FIG. 5, and FIG. 6, this embodiment is applied for hydroforming and processing of a blank. The structure of the hydroforming die 30 includes: an upper die set 31, a lower die set 32, and a blank holder 33. The upper die set 31 has an upper die base 311 and an upper die insert 312 which is provided on the upper die base 311 and has a cavity surface 3121. The lower die set 32 has a lower die base 321 and a hydraulic divide block 322 provided on the lower die base 321. The blank holder 33 has a blank holder body 331 and a flexible pad 332 provided on a pressing surface 3311 of the blank holder body 331 (the flexible pad 332 may be made of rubber, PU, or other soft materials, and thus has sufficient hardness while maintain sufficient elasticity). The blank holder 33 also has a through passage 333, and the passage 333 is assembled with the hydraulic divide block 322 to form a hydraulic chamber 334. Guide posts 34 are provided between the upper die set 31 and the lower die set 32 to define relative positions of the two die sets, and thereby, the upper die set 31 and the lower die set 32 are closed. The hydraulic divide block 332 continuously guides a high-pressure liquid 335 into the hydraulic chamber 334, to form the blank 35 placed on the pressing surface 3311. During the forming process, the flexible pad 332 is tightly pressed against the blank 35 upon the upper die set 31.

The hydroforming process is described as follows. The guide posts 34 are provided between the upper die set 31 and the lower die set 32 of the forming die for positioning the two die sets, which ensures correct relative positions of the upper die set 31 and the lower die set 32. When the upper die set 31 and the lower die set 32 are at correct die closing positions, a pressing device (for example, a press machine, not shown) is used to make the upper die set 31 tightly pressed against the lower die set 32, so that a sufficient pressing force is applied on the flexible pad 332 against the blank 35, to prevent leakage between the flexible pad 332 and the blank 35. The pressing device applies a pressing force to inject the high-pressure liquid 335 into the hydraulic chamber 334. The high-pressure liquid 335 pushes the blank 35, so the blank 35 is movable during the forming process and moves relative to the upper die set 31 and the flexible pad 332. As a pressing force is maintained between the blank 35 and the flexible pad 332 during the forming process, the blank 35 is eventually closely attached to the upper die set 31, and the blank is produced without causing leakage in the forming process.

Further, in the embodiment shown in FIG. 6, the upper die insert 312 includes a first upper die insert 312a and a second upper die insert 312b which are detachably assembled, and the cavity surface 3121 after assembly has a negative draft angle 31211, so that after hydraulic forming of the blank 35, the blank 35 with the negative draft angle can be obtained by disassembling the first upper die insert 312a and the second upper die insert 312b (for example, disassembling along die opening directions A, B depicted in FIG. 6).

Similarly, referring to FIG. 5 and FIG. 6, experiments of this embodiment show that, the blank 35 is capable of sliding on an inner surface (that is, the—surfaces 3120 and 3121) of the upper die insert 312 and an outer surface 3321 of the flexible pad 332. The flexible pad 332 is made of an elastic object, and thus can automatically implement spacing adjustment according to the thickness of the blank 35 in the forming process. The lower die set 32 has a hydraulic divide block 322, a liquid is injected from the outside into the hydraulic chamber 334 through the hydraulic divide block 322, and the blank 35 contacts the outer surface 3321 of the flexible pad 332 to form a closed loop. In this case, the high-pressure liquid 335 is continuously applied, and the blank 35 is formed by bulging. The forming process shows that, the flexible pad 332 can be firmly clamped on the blank 35 to prevent the blank 35 from being wrinkled and thus avoid leakage, and due to material characteristics of the flexible pad 332, the blank 35 in contact with the outer surface 3321 of the flexible pad 332 may not be scraped by drawing.

Further referring to FIG. 4, to maintain the sealing condition of the hydraulic chamber 334 under the pressure of the high-pressure liquid 335, an O-ring 323 is provided between the blank holder 33 and the hydraulic divide block 322 to enhance the sealing effect. Definitely, the blank holder 33 and the hydraulic divide block 322 may be both made of flexible materials and are integrally made (in this implementation aspect, the O-ring 323 is not required).

Definitely, to make the flexible pad 332 contact the blank 35, the position of the flexible pad 332 is corresponding to a lower surface 3120 of the upper die insert 312, and the flexible pad 332 covers the region of the cavity surface 3121.

The above merely describes exemplary implementation manners or embodiments of technical schemes employed by the present invention for solving the problems, but is not to limit the scope of implementation of the present invention. Equivalent variations and modifications consistent with the content of the claims of the present invention or made according to the scope of the present invention shall fall within the scope of the present invention.

What is claimed is:

1. A forming die with a flexible blank holder, applied to form and process a blank by cold stamping, and comprising:
    an upper die set, having an upper die base and an upper die insert provided on the upper die base and having a cavity surface;
    a lower die set, having a lower die base, an elastic member provided on the lower die base, and a lower die punch provided on the lower die base; and
    a blank holder, having a blank holder body and a flexible pad provided on a pressing surface of the blank holder body, the blank holder body being connected to an open end of the elastic member,
    wherein guide posts are provided between the upper die set and the lower die set to define relative positions of the two die sets; through relative movement of the upper die set and the lower die set, a blank placed on the pressing surface of the blank holder between the upper and lower die sets is formed; and during the forming process, the flexible pad is tightly pressed against the blank upon the upper die insert under the pressing force of the elastic member.

2. The forming die according to claim 1, wherein the flexible pad is corresponding to a lower surface of the upper die insert and covers the region of the cavity surface of the upper die insert.

3. The forming die according to claim 1, wherein the flexible pad is made of rubber or PU.

4. The forming die according to claim 1, wherein the elastic member is a compression spring.

5. The forming die according to claim 1, wherein the upper die insert and the upper die base are integrally made.

6. A forming die with a flexible blank holder, applied for hydroforming and processing of a blank, and comprising:
    an upper die set, having an upper die base and an upper die insert provided on the upper die base and having a cavity surface;
    a lower die set, having a lower die base and a hydraulic divide block provided on the lower die base; and
    a blank holder, having a blank holder body and a flexible pad provided on a pressing surface of the blank holder body, the blank holder having a through passage, and the passage being assembled with the hydraulic divide block to form a hydraulic chamber,
    wherein guide posts are provided between the upper die set and the lower die set to define relative positions of the two die sets, and thereby, the upper die set and the lower die set are closed; the upper die set and the lower die set are closely attached through a pressing device of the die; during the forming process, the pressing device applies a sufficient pressing force on the flexible pad, so that the flexible pad is tightly pressed against the blank upon the upper die insert; and a high-pressure liquid is guided into the hydraulic chamber through the hydraulic divide block, and is used to form the blank placed on the pressing surface, so that the blank is eventually closely attached to the upper die insert.

7. The forming die according to claim 6, wherein the upper die insert comprises a first upper die insert and a second upper die insert, and the cavity surface after assembly has a negative draft angle.

8. The forming die according to claim 6, wherein an O-ring is provided between the blank holder and the hydraulic divide block to seal the hydraulic chamber.

9. The forming die according to claim 6, wherein the blank holder and the hydraulic divide block are integrally made.

10. The forming die according to claim 6, wherein the flexible pad is corresponding to a lower surface of the upper die insert and covers the region of the cavity surface of the upper die insert.

11. The forming die according to claim 6, wherein the flexible pad is made of rubber, PU, or other soft materials.

* * * * *